US008373881B2

(12) United States Patent
Seta et al.

(10) Patent No.: US 8,373,881 B2
(45) Date of Patent: *Feb. 12, 2013

(54) IMAGE FORMATION APPARATUS, RECORDING MEDIUM, IMAGE FORMATION METHOD, AND CONSUMABLES MANAGEMENT SYSTEM

(75) Inventors: Akiko Seta, Kanagawa (JP); Noriyuki Matsuda, Kanagawa (JP); Masayasu Takano, Kanagawa (JP); Koji Adachi, Kanagawa (JP); Kaoru Yasukawa, Kanagawa (JP); Tetsuichi Satonaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 811 days.

This patent is subject to a terminal disclaimer.

(21) Appl. No.: 12/483,671

(22) Filed: Jun. 12, 2009

(65) Prior Publication Data

US 2010/0053671 A1 Mar. 4, 2010

(30) Foreign Application Priority Data

Aug. 28, 2008 (JP) ................................ 2008-220005

(51) Int. Cl.

| | |
|---|---|
| ***G06F 3/012*** | (2006.01) |
| ***G03G 15/00*** | (2006.01) |
| *G06F 3/00* | (2006.01) |

(52) U.S. Cl. ...... 358/1.15; 358/1.1; 358/1.14; 358/1.13; 399/8; 399/12; 709/201; 710/15; 710/18; 710/19

(58) Field of Classification Search ........ 358/1.11–1.18, 358/400–404, 1.1, 1.9, 2.1, 504, 406; 399/8–31, 399/49, 110, 111; 705/28; 709/206, 207, 709/223; 710/15–19

See application file for complete search history.

(56) References Cited

U.S. PATENT DOCUMENTS

| | | | | |
|---|---|---|---|---|
| 5,335,048 | A * | 8/1994 | Takano et al. | 399/8 |
| 8,086,115 | B2 * | 12/2011 | Yamasaki et al. | 399/8 |
| 8,275,271 | B2 * | 9/2012 | Satonaga et al. | 399/24 |
| 2004/0103048 | A1 * | 5/2004 | Vitulli et al. | 705/28 |
| 2004/0141201 | A1 * | 7/2004 | Shima | 358/1.15 |
| 2006/0168005 | A1 * | 7/2006 | Kanbara et al. | 709/206 |
| 2009/0070449 | A1 * | 3/2009 | Tanaka et al. | 709/223 |

FOREIGN PATENT DOCUMENTS

| | | | |
|---|---|---|---|
| JP | 2001-228762 | A | 8/2001 |
| JP | 2005-033460 | A | 2/2005 |
| JP | 2007-199642 | A | 8/2007 |
| JP | 2007199642 | A * | 8/2007 |

* cited by examiner

*Primary Examiner* — Twyler Haskins
*Assistant Examiner* — Chad Dickerson
(74) *Attorney, Agent, or Firm* — Sughrue Mion, PLLC

(57) ABSTRACT

An image formation apparatus, which includes: a detector unit that detects a status of consumables; a prediction unit that predicts a run-out timing of the consumables on the basis of the status detected by the detector unit; a transmission unit that transmits the status detected by the detector unit to a management apparatus as consumables information; a reception unit that receives run-out timing information indicating a run-out timing predicted by the management apparatus on the basis of the consumables information transmitted by the transmission unit; and a notification unit that notifies the run-out timing of the consumables on the basis of the run-out timing information received by the reception unit if communication with the management apparatus is possible, or notifies the run-out timing of the consumables on the basis of the run-out timing predicted by the prediction unit if communication with the management apparatus is not possible.

6 Claims, 7 Drawing Sheets

IMAGE FORMATION APPARATUS, RECORDING MEDIUM, IMAGE FORMATION METHOD, AND CONSUMABLES MANAGEMENT SYSTEM

CROSS-REFERENCE TO RELATED APPLICATION

This application is based on and claims priority under 35 USC 119 from Japanese Patent Application No. 2008-220005 filed on Aug. 28, 2008

BACKGROUND

1. Technical Field

The present invention relates to an image formation apparatus, a recording medium, an image formation method, and a consumables management system.

2. Related Art

Image formation apparatuses such as printers or copiers, which consume toner, ink, photosensitive media, and other various consumables, are often designed to predict the run-out timing of such consumables, notify that the run-out timing for a certain item of consumables is close, and to stop the apparatus when the run-out timing is reached.

SUMMARY

An aspect of the present invention provides an image formation apparatus, which includes: a detector unit that detects a status of consumables; a prediction unit that predicts a run-out timing of the consumables on the basis of the status detected by the detector unit; a transmission unit that transmits the status detected by the detector unit to a management apparatus as consumables information; a reception unit that receives run-out timing information indicating a run-out timing predicted by the management apparatus on the basis of the consumables information transmitted by the transmission unit; and a notification unit that notifies the run-out timing of the consumables on the basis of the run-out timing information received by the reception unit if communication with the management apparatus is possible, or notifies the run-out timing of the consumables on the basis of the run-out timing predicted by the prediction unit if communication with the management apparatus is not possible.

BRIEF DESCRIPTION OF THE DRAWINGS

Exemplary embodiments of the present invention will be described in detail based on the following figures, wherein.

DETAILED DESCRIPTION

Exemplary embodiments of an image formation apparatus, a recording medium, an image formation method, and a consumables management system according to the present invention will be described in detail with reference to the accompanying drawings.

First Example

Figure 1:
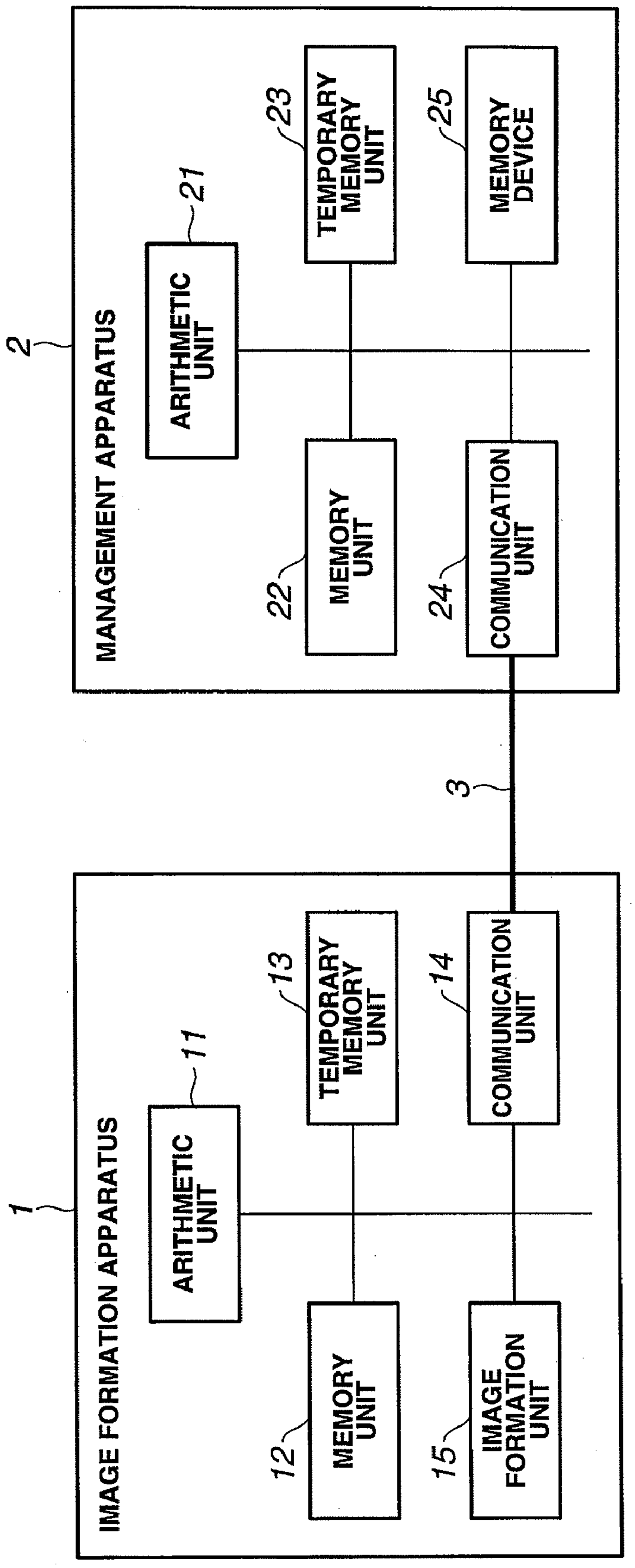
FIG. 1 is a diagram schematically showing a configuration example of an image formation apparatus 1 and a management apparatus 2.

FIG. 1 is a diagram schematically showing a configuration example of an image formation apparatus 1 and a management apparatus 2. As shown in FIG. 1, the image formation apparatus 1 has an arithmetic unit 11, a memory unit 12, a temporary memory unit 13, a communication unit 14, and an image formation unit 15.

The management apparatus 2 has an arithmetic unit 21, a memory unit 22, a temporary memory unit 23, a communication unit 24, and a memory device 25. The communication unit 14 and the communication unit 24, in other words, the image formation apparatus 1 and the management apparatus 2 are communicably connected to each other through a communication unit 3.

The arithmetic unit 11, which is for performing arithmetic processing, may be provided by a processor such as a CPU (Central Processing Unit). The memory unit 12, which is for storing information or the like, may be provided by a memory such as a ROM (Read Only Memory) or a nonvolatile memory. The temporary memory unit 13, which is for temporarily storing information or the like, may be provided by a memory such as a RAM (Random Access Memory). The communication unit 14, which is an interface for performing communication via the communication unit 3, may be provided, for example, by a network adapter. The image formation unit 15 is for forming images. The term "image formation unit" shall be used herein to collectively refer to hardware for image formation, a controller for controlling this hardware, and various sensors for detecting the status of consumables. The image formation apparatus 1 is also connected to an input device for entering information, a display device for displaying information and so on, but it will be assumed here that these are included in the image formation unit 15.

The arithmetic unit 21, which is for performing arithmetic processing, may be provided by a processor such as a CPU. The memory unit 22, which is for storing information or the like, may be provided by a memory such as a ROM or a nonvolatile memory. The temporary memory unit 13, which is for temporarily storing information, may be provided by a memory such as a RAM. The communication unit 14, which is an interface for performing communication via the communication unit 3, may be provided by a network adapter. The memory device 25, which is for storing information or the like, may be provided by a magnetic disk or the like. Although the management apparatus 2 may be connected to an input device for entering information or display device for displaying information, the description thereof will be omitted here.

While the communication unit 3 may be of any type, the communication unit 3 may be provided by Internet, for example.

Figure 2:
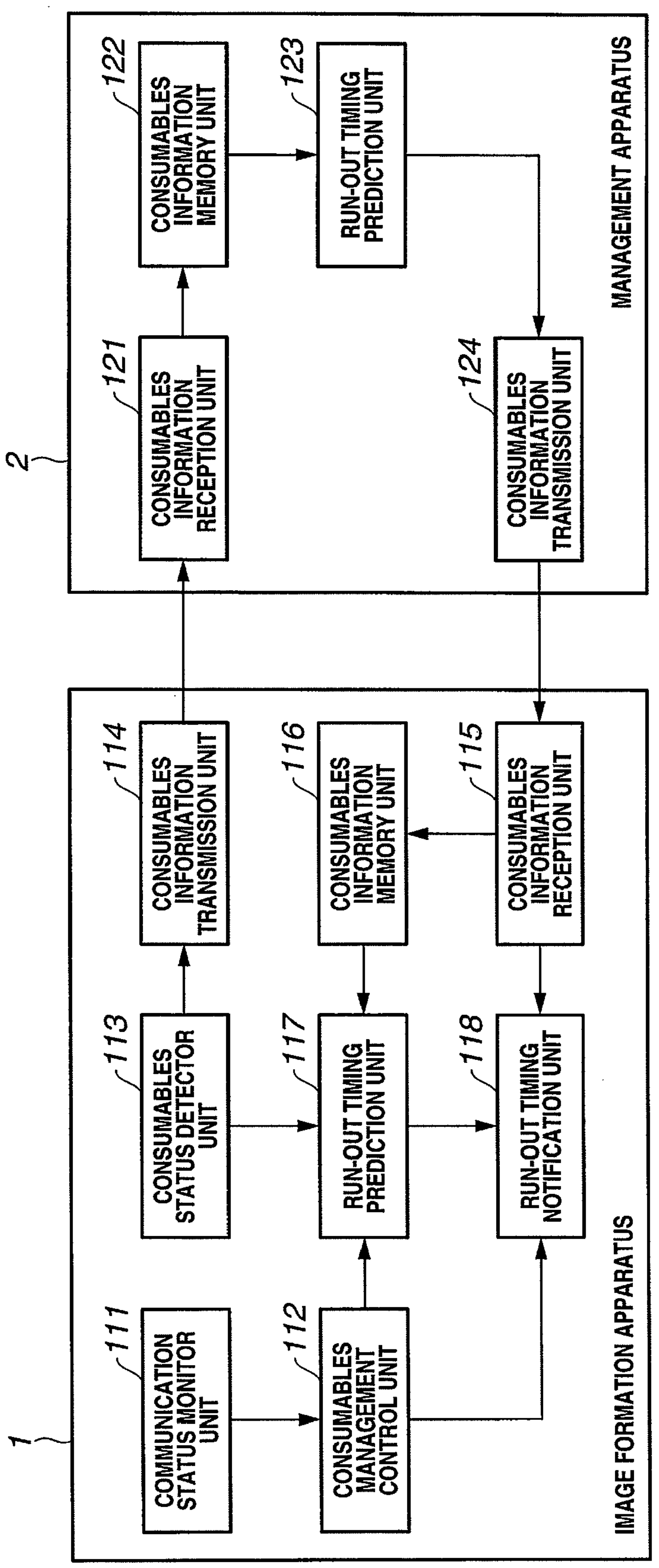
FIG. 2 is a block diagram showing an example of a functional configuration of the image formation apparatus 1 and the management apparatus 2.

The image formation apparatus 1 and the management apparatus 2 operate the arithmetic unit 11 and arithmetic unit 21 according to a program stored in the memory unit 12 and the memory unit 22 or memory device 25, respectively, to realize functional units shown in FIG. 2. Both the arithmetic unit 11 and the arithmetic unit 21 sometimes activate other units such as the temporary memory unit 13 during their operation.

FIG. 2 is a block diagram showing an example of a functional configuration of the image formation apparatus 1 and the management apparatus 2. As shown in FIG. 2, the image formation apparatus 1 has functional units of a communication status monitor unit 111, a consumables management control unit 112, a consumables status detector unit 113, a consumables information transmission unit 114, a consumables information reception unit 115, a consumables information memory unit 116, a run-out timing prediction unit 117, and a run-out timing notification unit 118.

The management apparatus 2 has functional units of a consumables information reception unit 121, a consumables information memory unit 122, a run-out timing prediction unit 123, and a consumables information transmission unit 124.

The communication status monitor unit 111 monitors whether or not communication is possible between the image formation apparatus 1 and the management apparatus 2. The consumables management control unit 112 controls the run-out timing prediction unit 117 and the run-out timing notification unit 118 to operate in different ways between when communication is possible and when not possible on the basis of the monitoring result of the communication status monitor unit 111. Specifically, when communication is possible between the image formation apparatus 1 and the management apparatus 2, the run-out timing prediction unit 117 is not activated and the run-out timing notification unit 118 is caused to perform processing on the basis of consumables information received by the consumables information reception unit 115. When communication is not possible between the image formation apparatus 1 and the management apparatus 2, the run-out timing prediction unit 117 is activated and the run-out timing notification unit 118 is caused to perform processing on the basis of a prediction result of the run-out timing prediction unit 117.

The consumables status detector unit 113 detects the status of consumables on the basis of outputs from or operation records recorded in various sensors provided in the image formation apparatus 1, and outputs information indicating the detected status of consumables. The consumables information transmission unit 114 generates consumables information by adding information for identifying the image formation apparatus 1 or other information to the information indicating the status of consumables output by the consumables status detector unit 113, and transmits the generated consumables information to the management apparatus 2.

The consumables information reception unit 121 receives the consumables information transmitted by the image formation apparatus 1, and stores the received consumables information in the consumables information memory unit 122. The run-out timing prediction unit 123 performs arithmetic processing on the basis of one or more pieces of consumables information stored in the consumables information memory unit 122 to predict the run-out timing of the consumables associated with the consumables information. The consumables information transmission unit 124 transmits the run-out timing predicted by the run-out timing prediction unit 123 to the image formation apparatus 1 as consumables information.

The consumables information reception unit 115 receives the consumables information transmitted by the management apparatus 2, and outputs the received consumables information to the run-out timing notification unit 118 while storing the same in the consumables information memory unit 116. The consumables information memory unit 116 stores the consumables information received last by the consumables information reception unit 115, that is, the latest consumables information. However, the consumables information memory unit 116 is not necessarily an indispensable functional unit, and when the consumables information memory unit 116 is not provided, the consumables information will not be stored.

The run-out timing prediction unit 117 is activated when communication is not possible between the image formation apparatus 1 and the management apparatus 2, and performs arithmetic processing or the like to predict the run-out timing of consumables on the basis of information indicating the status of consumables output by the consumables status detector unit 113. If the consumables information memory unit 116 is provided, the information received from the management apparatus 2 may be once stored in the consumables information memory unit 116 so that it is used during the operation. It should be noted that the prediction result of the run-out timing prediction unit 117, which predicts the run-out timing of consumables on the basis of either the information indicating the status of consumables output by the consumables status detector unit 113, or the sum of this information and the latest consumables information received from the management apparatus 2, is possibly less accurate than the prediction result of the run-out timing prediction unit 123 which predicts the run-out timing of consumables on the basis of one or more pieces of consumables information.

When communication is possible between the image formation apparatus 1 and the management apparatus 2, the run-out timing notification unit 118 performs notification processing on the basis of the consumables information that the consumables information reception unit 115 receives from the management apparatus 2. In contrast, when communication is not possible between the image formation apparatus 1 and the management apparatus 2, the run-out timing notification unit 118 performs notification processing on the basis of a prediction result of the run-out timing prediction unit 117. The notification processing is to display a message to prompt the user to replace the consumables, for example, when the run-out timing is close, or to halt operation of the image formation apparatus 1 when the run-out timing has been reached.

Figure 3:
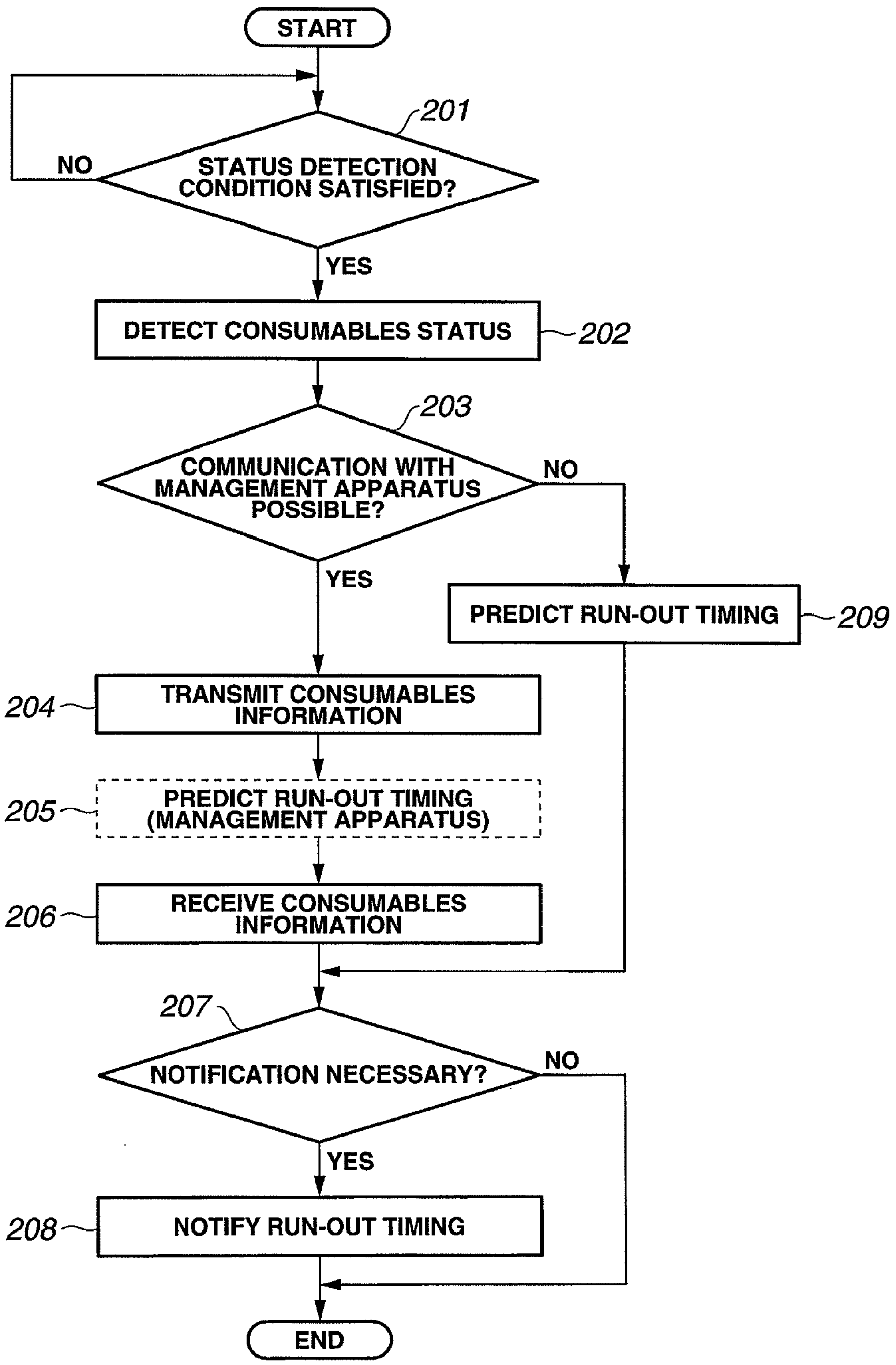
FIG. 3 is a flowchart showing a flow of operation of the image formation apparatus 1.

Next, description will be made on a flow of consumables management operation by the image formation apparatus 1. FIG. 3 is a flowchart showing a flow of operation of the image formation apparatus 1.

When a condition for detecting a status of consumables is satisfied (YES in step 201), the consumables status detector unit 113 detects the status of each item of consumables in the image formation apparatus 1 (step 202). The condition for detecting the status of consumables is preset such that the detection is conducted at certain time intervals or every time the image formation processing is performed. Obviously, the detection may be performed constantly so that a detection result output when any change occurs in the status of consumables.

When the consumables status detector unit 113 detects the status of consumables, the consumables information transmission unit 114 transmits the consumables information to the management apparatus 2 if communication with the management apparatus 2 is possible (YES in step 203) (step 204). The management apparatus 2 predicts the run-out timing on the basis of this consumables information (step 205: processing in the management apparatus 2), and the consumables information reception unit 115 receives the predicted run-out timing as consumables information (step 206). The run-out timing notification unit 118 then determines, on the basis of the consumables information received by the consumables information reception unit 115, whether or not notification processing is necessary. If the notification processing is determined to be necessary (YES in step 207), the notification of the run-out timing is performed (step 208), and the processing terminates.

In contrast, if the communication with the management apparatus 2 is not possible (NO in step 203), the run-out timing prediction unit 117 predicts the run-out timing on the basis of the status of consumables detected by the consumables status detector unit 113 (step 209), and the run-out timing notification unit 118 determines, on the basis of this prediction result, whether or not notification processing is necessary. If the notification processing is determined to be necessary (YES in step 207), the notification of run-out timing is performed (step 208), and the processing terminates.

The communication status monitor unit 111 determines in step 203 whether or not the communication with the management apparatus 2 is possible. This determination processing may be performed every time when the consumables status detector unit 113 detects the status of consumables, whereas it may be performed periodically or every time when the image formation apparatus 1 is activated or restored from the power-saving state.

Figure 4:
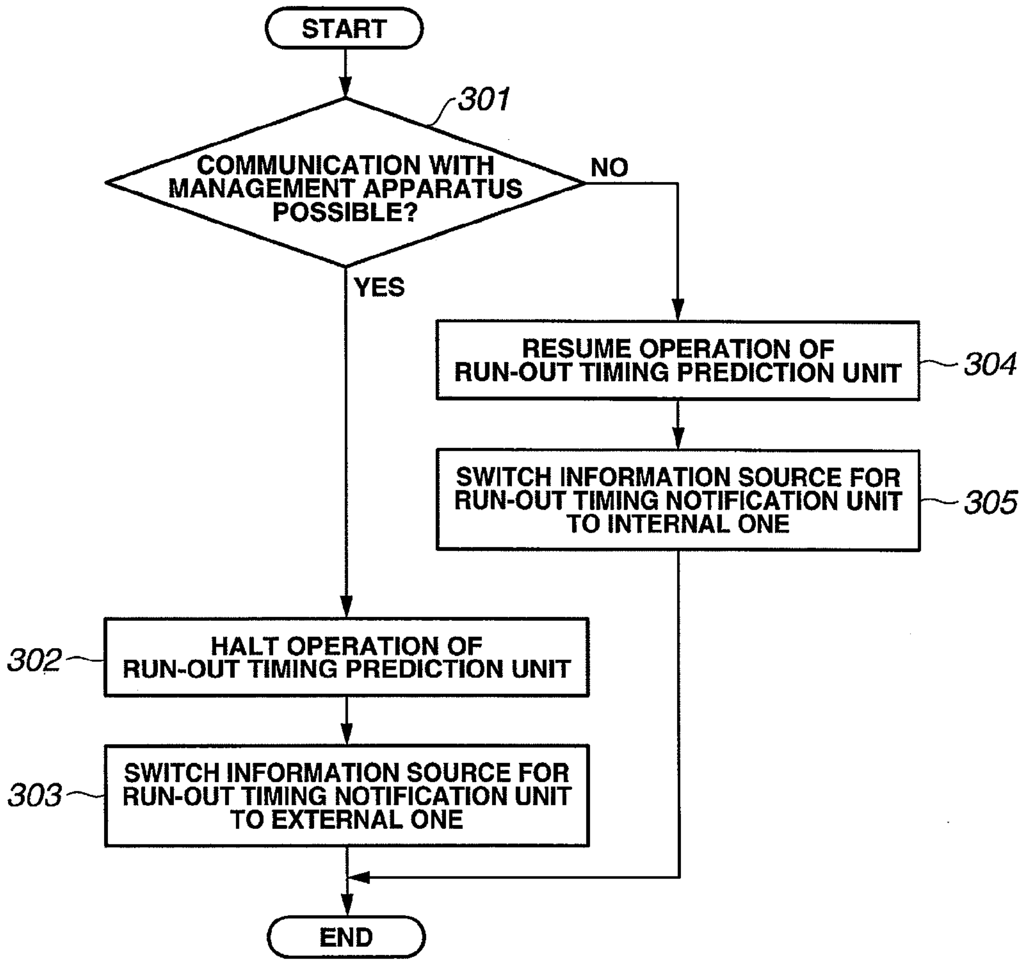
FIG. 4 is a flowchart showing a flow of operation of a consumables management control unit 112.

Next, description will be made of a flow of operation of the image formation apparatus 1 on the basis of operation of the consumables management control unit 112. FIG. 4 is a flowchart showing a flow of operation of the consumables management control unit 112.

If the monitoring result by the communication status monitor unit 111 indicates that communication with the management apparatus 2 is possible (YES in step 301), the consumables management control unit 112 halts operation of the run-out timing prediction unit 117 (step 302), and switches the operation of the run-out timing notification unit 118 such that the source of information used to perform the notification processing is switched to an external source, that is, the consumables information that the consumables information reception unit 115 receives from the management apparatus 2 (step 303). However, if the operation of the run-out timing prediction unit 117 is already halted and the information source for the run-out timing notification unit 118 is switched to the external source, the consumables management control unit 112 does not perform any processing at all.

If the monitoring result by the communication status monitor unit 111 indicates that communication with the management apparatus 2 is not possible (NO in step 301), the consumables management control unit 112 causes the run-out timing prediction unit 117 to start its operation (step 304), and switches the operation of the run-out timing notification unit 118 such that the source of information used to perform the notification processing is switched to an internal source, that is, a prediction result by the run-out timing prediction unit 117 (step 305). However, if the run-out timing prediction unit 117 is already operating, and the information source for the run-out timing notification unit 118 is switched to the internal source, the consumables management control unit 112 does not perform any processing at all.

Second Example

Figure 5:
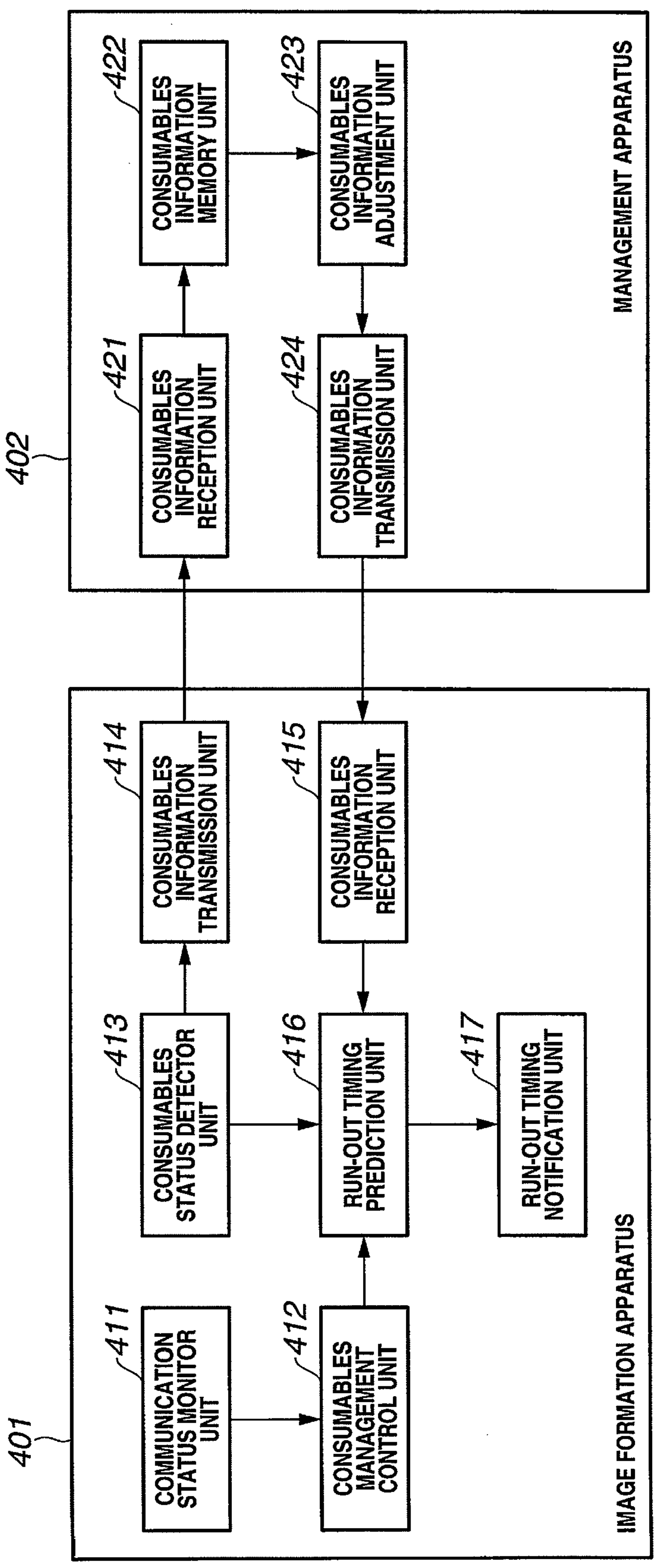
FIG. 5 is a block diagram showing an example of a functional configuration of an image formation apparatus 401 and a management apparatus 402 according to a second example of the present invention.

FIG. 5 is a block diagram showing an example of a functional configuration of an image formation apparatus 401 and a management apparatus 402 according to a second example. The image formation apparatus 401 and the management apparatus 402 correspond to the image formation apparatus 1 and the management apparatus 2, respectively, having the same configuration as FIG. 1.

As shown in FIG. 5, the image formation apparatus 401 has functional units of a communication status monitor unit 411, a consumables management control unit 412, a consumables status detector unit 413, a consumables information transmission unit 414, a consumables information reception unit 415, a run-out timing prediction unit 416, and a run-out timing notification unit 417.

The management apparatus 402 has functional units of a consumables information reception unit 421, a consumables information memory unit 422, a consumables information adjustment unit 423, and a consumables information transmission unit 424.

The communication status monitor unit 411 monitors whether or not communication is possible between the image formation apparatus 401 and the management apparatus 402. On the basis of a monitoring result by the communication status monitor unit 411, the consumables management control unit 412 controls the run-out timing prediction unit 416 to operate in different ways between when communication is possible and when communication is not possible. Specifically, when communication is possible between the image formation apparatus 401 and the management apparatus 402, the run-out timing prediction unit 416 is caused to predict a run-out timing on the basis of consumables information adjusted by the management apparatus 402. In contrast, when communication is not possible between the image formation apparatus 401 and the management apparatus 402, the run-out timing prediction unit 416 is caused to predict a run-out timing on the basis of the status of consumables detected by the consumables status detector unit 413.

The consumables status detector unit 413 detects a status of consumables on the basis of outputs from various sensors or operation records in the image formation apparatus 401 and so on, and outputs information indicating the status of consumables. The consumables information transmission unit 414 generates consumables information by adding information for identifying the image formation apparatus 401 or the like to the information indicating the status of consumables output by the consumables status detector unit 413, and transmits the generated consumables information to the management apparatus 402.

The consumables information reception unit 421 receives the consumables information transmitted by the image formation apparatus 401, and stores this information in the consumables information memory unit 422. The consumables information adjustment unit 423 performs arithmetic processing or the like to adjust the consumables information stored last, that is, the latest consumables information on the basis of one or more pieces of consumables information stored in the consumables information memory unit 422. The consumables information transmission unit 424 transmits the consumables information adjusted by the consumables information adjustment unit 423 to the image formation apparatus 401.

The consumables information reception unit 415 receives the consumables information transmitted by the management apparatus 402 and outputs the received information to the run-out timing prediction unit 416.

When communication is possible between the image formation apparatus 401 and the management apparatus 402, the run-out timing prediction unit 416 performs arithmetic operations or the like to predict a run-out timing of consumables on the basis of the consumables information adjusted by the management apparatus 402 received by the consumables information reception unit 415. In contrast, when communication is not possible between the image formation apparatus 401 and the management apparatus 402, the run-out timing prediction unit 416 performs arithmetic operations or the like to predict a run-out timing of consumables on the basis of the information indicating the status of consumables output by the consumables status detector unit 413. Since the management apparatus 402 adjusts consumables information on the basis of one or more pieces of consumables information, the run-out timing predicted on the basis of the consumables information adjusted by the management apparatus 402 is possibly more accurate than a run-out timing predicted on the basis of information indicating the status of consumables output by the consumables status detector unit 413.

The run-out timing notification unit 417 performs notification processing on the basis of a prediction result of the run-out timing prediction unit 416. The notification processing is, for example, to display a message to prompt the user to replace the consumables when the run-out timing is close, or to halt operation of the image formation apparatus 401 when the run-out timing is reached.

Figure 6:
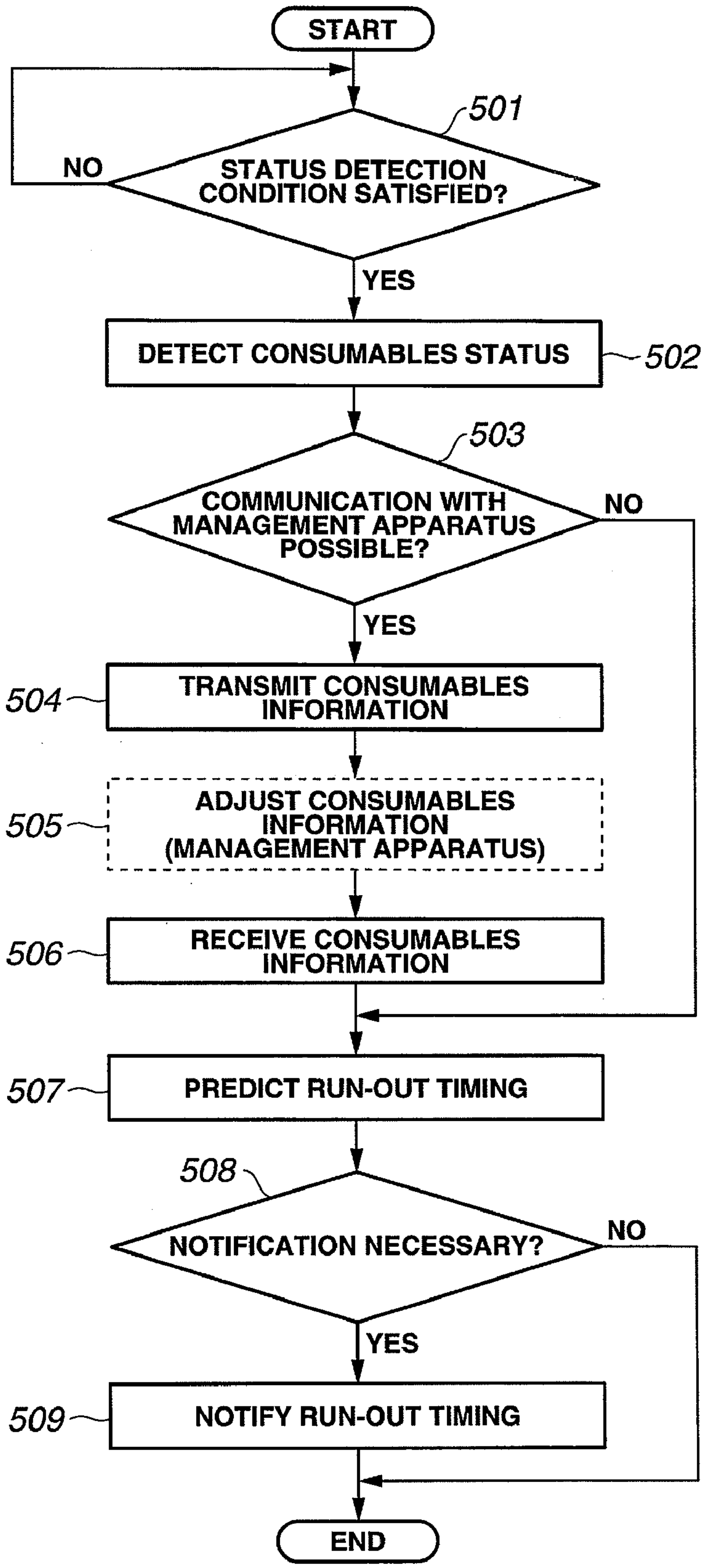
FIG. 6 is a flowchart showing a flow of operation of the image formation apparatus 401.

Next, description will be made of a flow of consumables management operation of the image formation apparatus 401. FIG. 6 is a flowchart showing a flow of operation of the image formation apparatus 401.

When a condition for detecting a status of consumables is satisfied (YES in step 501), the consumables status detector unit 413 detects the status of each item of consumables in the image formation apparatus 1 (step 502). The condition for detecting the status of consumables is preset such that the detection is conducted at certain time intervals or every time the image formation processing is performed. Obviously, the detection may be performed constantly so that a detection result output when any change occurs in the status of consumables.

Once the consumables status detector unit 413 detects the status of consumables, the consumables information transmission unit 414 transmits the consumables information to the management apparatus 402 (step 504), if communication with the management apparatus 402 is possible (YES in step 503). This consumables information is adjusted by the management apparatus 402 (step 505: processing in the management apparatus 402), and the consumables information reception unit 415 receives the adjusted consumables information (step 506). The run-out timing prediction unit 416 predicts the run-out timing on the basis of the consumables information received by the consumables information reception unit 415 (step 507), and the run-out timing notification unit 417 determines whether or not notification processing is necessary on the basis of the prediction result. If the notification processing is determined to be necessary (YES in step 408), notification of the run-out timing is performed (step 409), and the processing terminates.

In contrast, if the communication with the management apparatus 402 is not possible (NO in step 503), the run-out timing prediction unit 416 predicts the run-out timing on the basis of the status of consumables detected by the consumables status detector unit 413 (step 507), and the run-out timing notification unit 417 determines whether or not notification processing is necessary on the basis of the prediction result. If it is determined that the notification processing is necessary (YES in step 508), the notification of the run-out timing is performed (step 509), and the processing terminates.

While the communication status monitor unit 411 determines in step 503 whether or not the communication with the management apparatus 402 is possible, this determination processing may be performed every time when the consumables status detector unit 413 detects a status of consumables. Further, it may be performed periodically or every time when the image formation apparatus 401 is activated or returned from the power-saving state.

Figure 7:
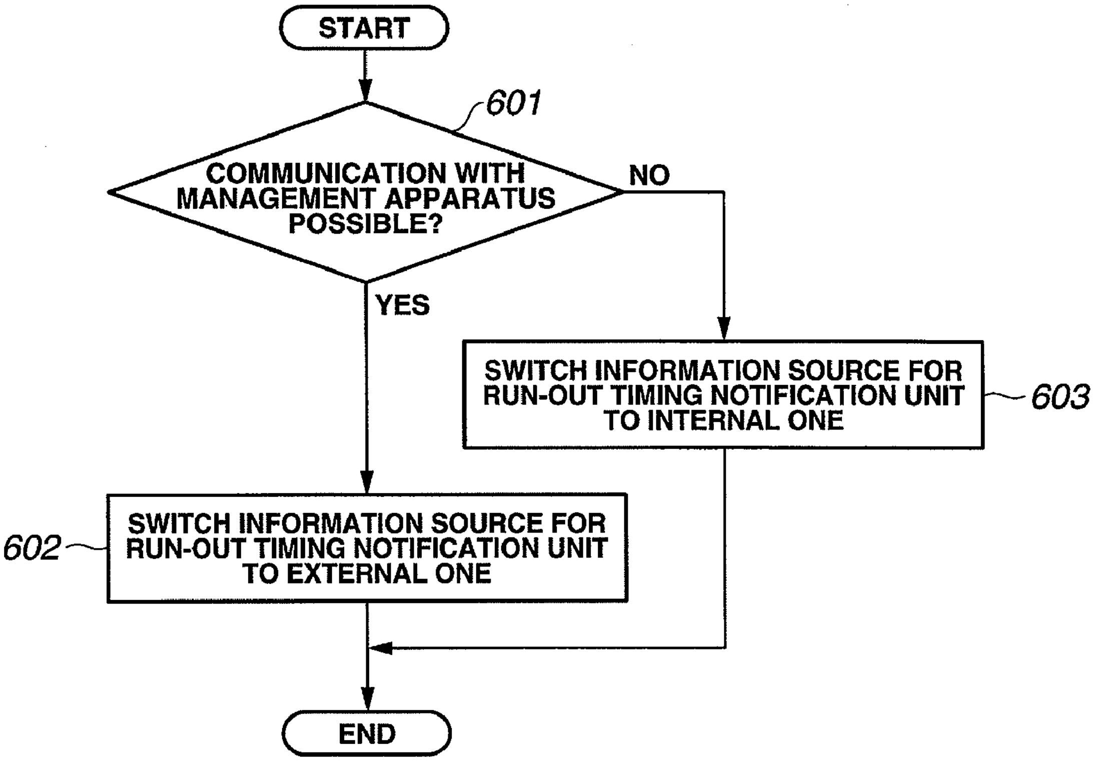
FIG. 7 is a flowchart showing a flow of operation of a consumables management control unit 412.

Next, a flow of operation of the image formation apparatus 401 will be described on the basis of the operation of the consumables management control unit 412. FIG. 7 is flowchart showing a flow of operation of the consumables management control unit 412.

If the monitoring result by the communication status monitor unit 411 indicates that communication with the management apparatus 402 is possible (YES in step 601), the consumables management control unit 412 switches the operation of the run-out timing prediction unit 416 to cause the run-out timing prediction unit 416 to perform the prediction on the basis of an external source, that is, the consumables information that the consumables information reception unit 415 receives from the management apparatus 402 (step 602). However, if the information source of the run-out timing prediction unit 416 is already switched to the external source, the consumables management control unit 412 does not perform any processing at all.

In contrast, if the monitoring result by the communication status monitor unit 411 indicates that communication with the management apparatus 402 is not possible (NO in step 601), the consumables management control unit 412 switches the operation of the run-out timing prediction unit 416 to cause the run-out timing prediction unit 416 to perform prediction on the basis of an internal source, that is, the status of consumables detected by the consumables status detector unit 413 (step 603). However, if the information source of the run-out timing prediction unit 416 is already switched to the internal source, the consumables management control unit 412 does not perform any processing at all.

An aspect of the present invention may provide a computer readable recording medium storing an image formation program that causes a computer to execute a process, the process comprising:

detecting a status of consumables;

transmitting the detected status of consumables to a management apparatus as consumables information;

receiving adjusted consumables information returned on the basis of the transmitted consumables information by the management apparatus;

predicting a run-out timing of consumables on the basis of the returned adjusted consumables information if communication with the management apparatus is possible, or predicting the run-out timing of consumables on the basis of the detected status if communication with the management apparatus is not possible; and notifying the predicted run-out timing of consumables.

Another aspect of the present invention may provide an image formation method comprising:

detecting a status of consumables;

transmitting the detected status to a management apparatus as consumables information;

receiving adjusted consumables information returned on the basis of the transmitted consumables information by the management apparatus;

predicting a run-out timing of consumables on the basis of the received adjusted consumables information if communication with the management apparatus is possible, or predicting the run-out timing of consumables on the basis of the detected status if communication with the management apparatus is not possible; and notifying the predicted run-out timing of consumables.

Still another aspect of the present invention may provide a consumables management system comprising:

an image formation apparatus that forms images; and a management apparatus that returns adjusted consumables information on the basis of consumables information acquired from the image formation apparatus, wherein the image formation apparatus comprises:

a detector unit that detects a status of consumables;

a transmission unit that transmits the status of consumables detected by the detector unit to the management apparatus as consumables information;

a reception unit that receives adjusted consumables information returned by the management apparatus on the basis of the consumables information transmitted by the transmission unit;

a prediction unit that predicts a run-out timing of consumables on the basis of the adjusted consumables information received by the reception unit if communication with the management apparatus is possible, or predicting the run-out timing of consumables on the basis of the status detected by the detector unit if communication with the management apparatus is not possible; and a notification unit that notifies the run-out timing predicted by the prediction unit.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image formation apparatus comprising:

a consumables management control unit;

a detector unit that detects a status of consumables to be consumed by the image formation apparatus;

a transmission unit that transmits the status of consumables detected by the detector unit to a management apparatus as first consumables information;

a reception unit that receives second consumables information returned by the management apparatus, wherein the management apparatus generates the second consumables information using the first consumables information transmitted by the transmission unit, wherein the consumables management control unit determines whether or not communication between the image formation apparatus and the management apparatus is possible, wherein, in response to the consumables management control unit determining that communication between the image formation apparatus and the management apparatus is possible, the consumables management control unit controls prediction of a run-out timing of the consumables using the second consumables information received by the reception unit;

wherein, in response to the consumables management control unit determining that communication between the image formation apparatus and the management apparatus is not possible, the consumables management control unit controls prediction of the run-out timing of the consumables using the status of consumables detected by the detector unit, and without using any communication from the management apparatus; and a notification unit that notifies the prediction of the run-out timing of the consumables.

2. A non-transitory computer readable recording medium storing an image formation program that causes a computer to execute a process, the process comprising:

detecting a status of consumables to be consumed by an image formation apparatus;

transmitting the detected status of consumables to a management apparatus as first consumables information;

receiving second consumables information from the management apparatus, wherein the management apparatus generates the second consumables information using the transmitted first consumables information;

determining whether or not communication between the image formation apparatus and the management apparatus is possible;

predicting a run-out timing of the consumables;

wherein, in response to determining that communication between the image formation apparatus and the management apparatus is possible, the predicting the run-out timing of the consumables is performed using the received second consumables information, and wherein, in response to determining that communication between the image formation apparatus and the management apparatus is not possible, the predicting the run-out timing of the consumables is performed using the detected status of consumables, and without using any communication from the management apparatus; and notifying the prediction of the run-out timing of the consumables.

3. An image formation method comprising:

detecting a status of consumables to be consumed by an image formation apparatus;

transmitting the detected status of consumables to a management apparatus as first consumables information;

receiving second consumables information from the management apparatus, wherein the management apparatus generates the second consumables information using the transmitted first consumables information;

determining whether or not communication between the image formation apparatus and the management apparatus is possible;

predicting a run-out timing of the consumables;

wherein, in response to determining that communication between the image formation apparatus and the management apparatus is possible, the predicting the run-out timing of the consumables is performed using the received second consumables information, and wherein, in response to determining that communication between the image formation apparatus and the management apparatus is not possible, the predicting the run-out timing of the consumables is performed using the detected status of consumables, and without using any communication from the management apparatus; and notifying prediction of the run-out timing of the consumables.

4. A consumables management system comprising:

an image formation apparatus; and a management apparatus;

wherein the image formation apparatus comprises:

a consumables management control unit;

a detector unit that detects a status of consumables to be consumed by the image formation apparatus;

a transmission unit that transmits the status of consumables detected by the detector unit to the management apparatus as first consumables information;

a reception unit that receives second consumables information from the management apparatus, wherein the management apparatus generates the second consumables information using the first consumables information transmitted by the transmission unit, wherein the consumables management control unit determines whether or not communication between the image formation apparatus and the management apparatus is possible, wherein, in response to the consumables management control unit determining that communication between the image formation apparatus and the management apparatus is possible, the consumables management control unit controls prediction of a run-out timing of the consumables using the second consumables information received by the reception unit, wherein, in response to the consumables management control unit determining that communication between the image formation apparatus and the management apparatus is not possible, the consumables management control unit controls prediction of the run-out timing of the consumables using the status of consumables detected by the detector unit, and without using any communication from the management apparatus; and a notification unit that notifies the prediction of the run-out timing of the consumables.

5. The image formation apparatus according to claim 1, further comprising:

a prediction unit that predicts the run-out timing of the consumables using the status of consumables detected by the detector unit, wherein the second consumables information comprises run-out timing information indicating the run-out timing of the consumables predicted by the management apparatus using the first consumables information.

6. The image formation apparatus according to claim 1, wherein the management apparatus generates the second consumables information using previously stored consumables information.

* * * * *